United States Patent [19]
Hogge

[11] Patent Number: 4,975,912
[45] Date of Patent: Dec. 4, 1990

[54] BRACKISH-WATER WIRE DETECTOR

[75] Inventor: Ernest A. Hogge, Panama City, Fla.

[73] Assignee: The United States of America as represented by the Secretary of the Navy, Washington, D.C.

[21] Appl. No.: 632,145

[22] Filed: Apr. 10, 1967

[51] Int. Cl.$^5$ .............................................. G01S 15/00
[52] U.S. Cl. ........................................ 367/096; 367/99
[58] Field of Search ...................... 340/4, 4 A; 367/99, 367/96, 106, 908; 102/406

[56] References Cited
U.S. PATENT DOCUMENTS 2,238,072 4/1941 Nelson et al. ........................ 102/406
3,020,470 2/1962 Showhan .............................. 367/93
3,060,883 10/1962 Herbst .................................. 102/406

Primary Examiner—Thomas H. Tarcza
Assistant Examiner—Daniel T. Pihulic
Attorney, Agent, or Firm—Harvey David; John Becker; Sol Sheinbein

[57] ABSTRACT

A detector of electrical wires which aer partially submerged in water and partially extend out thereof having a means for broadcasting electromagnetic energy to the underwater portion thereof and means for receiving electromagnetic energy from the out of the water portion thereof.

14 Claims, 2 Drawing Sheets

BRACKISH-WATER WIRE DETECTOR

The invention described herein may be manufactured and used by or for the Government of the United States of America for governmental purposes without the payment of any royalties thereon or therefor.

The present invention relates generally to electromagnetic energy radiating and receiving systems and, in particular, is a method and means for indicating the presence and severance of insulated, underwater command wires of an electrically detonated river mine, which extend upon the river bank to a firing box.

In the past, the bottoms of rivers, believed to be mined with mines electrically detonated by lead wires connected to an electrical power supply on the river bank, have been dragged or swept with large, heavy chains containing various and sundry wire cutters. Of course, for some purposes and under some circumstances such arrangement has proven to be quite satisfactory; however, for many operational situations, it leaves a great deal to be desired, because no positive indication is obtained therefrom that one or more of such electrical lead wires have been encountered or actually severed.

Although, as previously implied, numerous successful wirecuttings has been effected by using the aforementioned prior art method, the actual results are, in fact, left up to chance, with the wire cuttings only being probable, inasmuch as the conditions of the water and the circumstances under which it is being traveled often prevents any effective inspection of the river bottoms for mines or uncut or cut river mine lead wires. As a result of this, people navigating and working in mined waters performed their tasks under extremely hazardous conditions, usually on little more than hope or faith that the aforementioned prior art devices and procedures have been effective in neutralizing the mines to which they are being exposed.

Where the safety of military personnel and equipment is concerned, it may readily be seen that effecting a far more positive determination that a marine mine is neutralized by having its detonation power supply definitely severed therefrom is of paramount importance. And this is especially true regarding muddy rivers, which must perhaps be navigated in enemy territory by ships, barges, boats, and the like, in order to transport much needed supplies and people to inland battle areas or other strategic locations.

With the exception of the aforesaid chain drag procedure and perhaps the ineffective use of various sonar systems for locating the mines themselves, no other prior art is known to the inventor at this time that will do the job done by this invention. It may, therefore, be said that the subject invention is a considerable improvement over the known prior art and may, indeed, be the first effective method and means for accomplishing the objectives thereof.

It is, thus, an object of this invention to provide a method and means for detecting insulated river mine command wires laying on or perhaps partially submerged in muddy or sandy river bottoms which extend upon the river bank to a firing box.

Another object of this invention is to provide a method and means for indicating that detected river mine lead wires extending upon the river bank have been cut.

Still another object of this invention is to provide a method and means for inferentially determining the possible location from which a clandestine enemy ambush or attack could originate.

Another object of this invention is to provide an improved method and means for ascertaining those rivers, canals, lakes, bays, channels, oceans, or other locations which would definitely make marine transports traveling thereon vulnerable to destruction by submarine mines and/or military attack.

A further object of this invention is to provide an improved method and means for disabling and/or neutralizing river and other marine mines.

A further object of this invention is to provide an improved method and means of locating insulated electrical conductors that are partially disposed within a subaqueous medium and partially extend into an atmospheric medium.

Another object of this invention is to provide an improved method and means for instantaneously indicating the cutting of an insulated wire having a part thereof located in water and a part thereof not located in water.

Another object of this invention is to provide an improved method and means for effectively sweeping marine mine fields, the mines of which are of the type detonated electrically through insulated command wires extending to a manually operated firing box located out of the water.

Still another object of this invention is to provide a method and means for locating and cutting insulated electrical conductors that are partially submerged in water and partially not submerged in water, wherein said method and means have a substantially optimized signal-to-noise ratio.

Other objects and many of the attendant advantages will be readily appreciated as the subject invention becomes better understood by reference to the following detailed description, when considered in conjunction with the accompanying drawings wherein.

Figure 1:
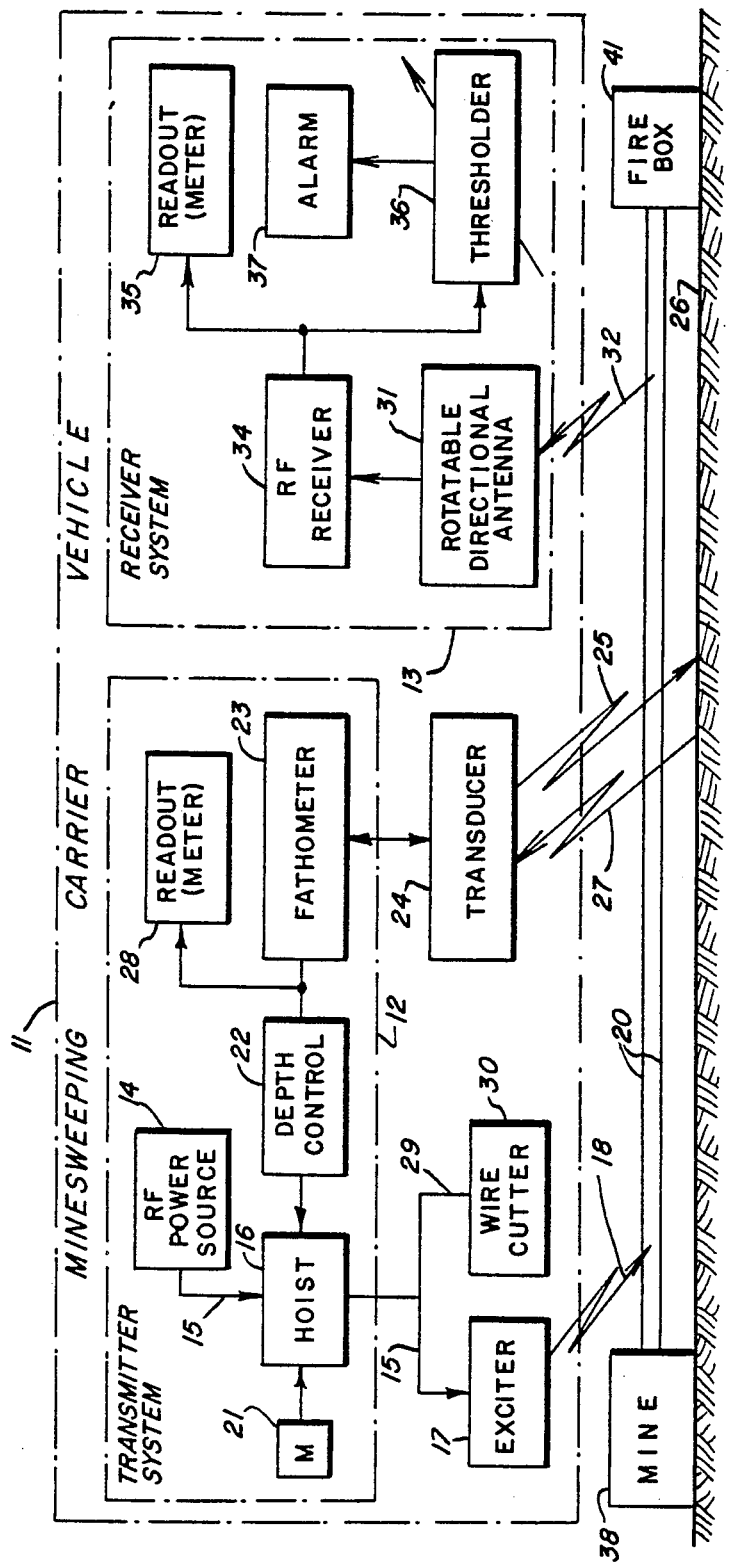
FIG. 1 is a block diagram representation of an overall system constituting a preferred embodiment of the subject invention.
Figure 2:
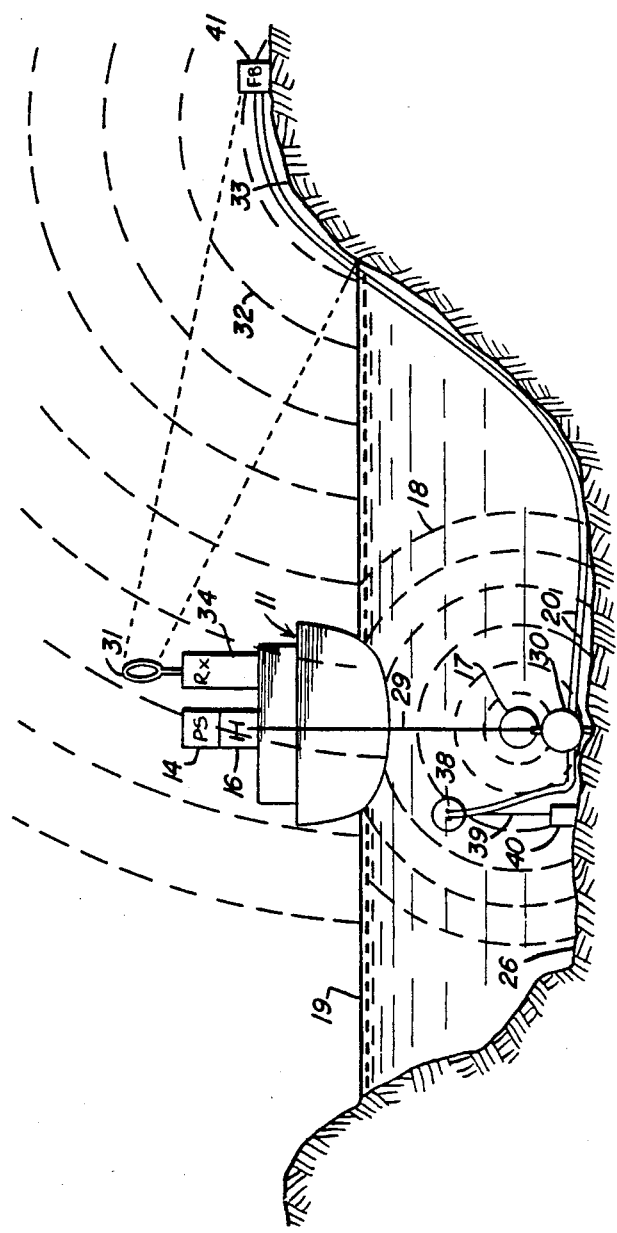
FIG. 2 is a schematic quasi-pictorial view of the subject invention which illustrates an exemplary modus operandi thereof.
Figure 3:
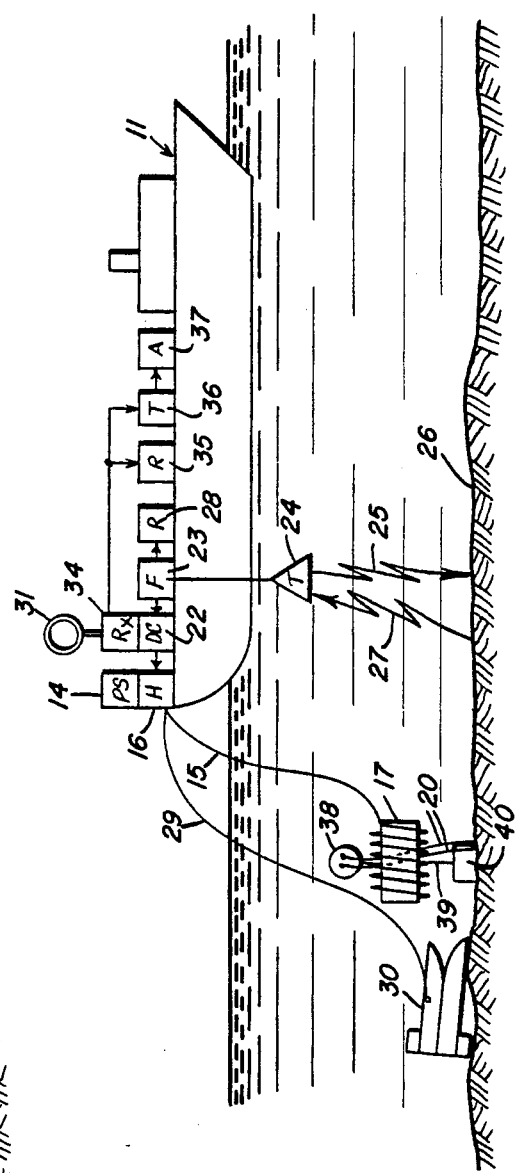
FIG. 3 is another schematic quasi-pictorial view of the subject invention which depicts exemplarily the relationships among the various and sundry elements thereof.

Referring now to FIGS. 1, 2, and 3, all of which (with minor exceptions) include like reference numerals for like elements for the sake of simplicity of disclosure, there is shown a mine-sweeping carrier vehicle 11 which acts as the transport for the remainder of the apparatus. Although shown in FIGS. 2 and 3 as being a boat or ship, as implied by the general teaching of FIG. 1, it is not intended that vehicle 11 be limited thereto, inasmuch as any other suitable craft—be it marine, air, or other type—may be substituted therefor, as operational circumstances warrant.

Disposed at any convenient locations on vehicle 11, are a transmitter system 12 and a receiver system 13, the latter of which is designed so as to be responsive to the signals broadcast by the former. Transmitter system 11 includes a radio frequency, electromagnetic energy power source 14, which is connected by means of an electrical cable 15, operated by a hoist 16 for the timely changing of the length thereof, to the input of an exciter 17.

In the preferred embodiment disclosed herewith, exciter 17 is a coil or inductance type of exciter, which broadcasts electromagnetic energy 18 throughout its ambient environment, in this case river water 19, and, therefore, toward insulated electrical conductors 20 to be detected and severed.

However, it should be understood that any other suitable electromagnetic transducer, such as, for example, an appropriate dipole antenna, may be substituted for exciter 17, if so desired and operational circumstances so warrant, inasmuch as so doing would be well within the purview of one skilled in the art having the benefit of the teachings herewith presented.

In order to maintain exciter 17 at a substantially optimum altitude above the river bottom, hoist 16 raises or lowers cable 15. Control of hoist 16 may be either manually by means of a manual control 21 or automatically by means of a depth controller 22, which, in turn, is connected to the output of a fathometer 23 in such manner as to be supplied an analog signal representing river depth at any given instant.

Fathometer 23 may be any appropriate echo-ranging system (such as, for example, a suitable sonar transceiver), and is connected to a reversible electroacoustical transducer 24 for the broadcast of sonic energy 25 toward the river bottom 26 and for the reception of an echo 27 thereof, after it has been reflected therefrom, thereby determining the river depth.

At this time, it may be well to point out that numerous ways of maintaining exciter 17 at a predetermined distance and attitude above the river bottom are available and may be used in conjunction with this invention, if so desired. For instance, in the event a high degree of apparatus sophistication and accuracy are desired, a bottom follower vehicle may be used. On the other hand, exciter 17 may be so encased and weighted that it may simply be dragged along the river bottom by its electrical cable or by any suitable structural support cable attached thereto, and it would obviously still do its intended job under some operational circumstances. Accordingly, the disclosed exciter disposition means, though perhaps important, is not to be construed as limiting.

A readout 28—which may be merely an indicating meter or a recorder, as preferred—is optionally connected to the output of Fathometer 23 to enable a human operator to know the river depth he is traversing at any given time, thereby enabling him to manually adjust hoist 16 during the manual operation thereof.

Also optionally connected to hoist 16 by means of a cable 29 is a wire cutter 30 of any suitable type. Of course, hoist 16 may be so constructed as to raise and lower exciter 17 and wire cutter 30 either simultaneously or independently. Furthermore, it should be understood that any additional towing apparatus, such as bridles, cables, and the like, may be employed to maintain exciter 17 and cutter 30 in a predetermined geometrical configuration relative to each other and/or carrier vehicle 11.

As previously mentioned, receiver system 13 is also disposed on carrier vehicle 11. It includes a rotatable directional antenna 31 adapted for response to that portion of the electromagnetic energy 32 rebroadcast by the section of insulated wires 20 extending out of the water and into the atmospheric environment at river bank 33. As will be discussed more fully in the discussion of the operation of the subject invention, antenna 31 should be so designed as to have a predetermined directional response pattern, which enables it to exclude substantially all electromagnetic energy ambient thereto except that to which it is directed. For this purpose, a simple loop antenna as portrayed in FIGS. 2 and 3 may suffice; however, if warranted by operational conditions, a more elaborate antenna with parabolic reflector may be employed. In either case, the directionality of said antennas considerably improves the signal-to-noise characteristics thereof, thereby increasing the overall sensitivity of the receiving system portion of the invention. Rotatability is, of course, necessary for such antennas, in order that they may be turned to pinpoint and indicate the place where the highest intensity electromagnetic energy is emanating from, viz., the exact position of the insulated command wires located out of the water on the river bank and perhaps extending into the forest, jungle, or other things capable of hiding human mine detonators and/or possible attackers.

The output of antenna 31 is connected to a radio frequency receiver 34, the output of which is connected to the inputs of a readout 35 (such as, for example, an indicating meter or recorder) and a variable thresholder 36, the latter of which has its output connected to a compatible alarm 37, such as, for example, a bell or a light or both. Thresholder 36 is, of course, of the type which is set to produce an output signal only when an input signal having a predetermined amplitude is supplied thereto, thereby preventing the passage of unwanted background noise, low level interface radiations, and other spurious signals from erroneously sounding the alarm.

As is conventional in river mine warfare, insulated electrical lead wires 20 are connected at one end to an electrically detonatable mine 38, which is usually held in place in the river channel by a cable 39 and an anchor 40. At the other end, wires 20 are usually connected to a fire box 41. Fire box 41 may be any conventional or otherwise suitable type. Ordinarily such boxes contain a battery and possibly a switch of sorts that electrically connect the command wires thereto. Fire box 41 per se actually does not constitute an absolutely necessary part of this invention, but it has herewith been described to further the understanding of mine detonation apparatus being disabled by this invention.

The operation of the present invention will now be discussed briefly in conjunction with FIGS. 2 and 3 as follows:

For the purpose of this discussion, a river will be considered as being the type of aqueous medium that is being swept to detect and cut electrical mine command wires, and a ship will be considered as being the carrier vehicle doing the detecting and/or cutting.

As ship 11, carrying the subject invention, travels up (or down) a river of brackish water, believed to contain submerged marine mines capable of being detonated by shore-controlled electrical command wires, Fathometer 23 continuously ascertains the water depth and effectively adjusts hoist 16 through depth control 22 in such manner as to position exciter coil 17 a predetermined, substantially optimum distance from the river bottom. Furthermore, as a result of its tow-cable configuration, coil 17 is oriented in substantially a horizontal position with its longitudinal axis essentially perpendicular to the wire laying on the river bottom to be detected. The aforesaid coil disposition is, of course, preferable in order to obtain maximum possible electromagnetic interaction and effectiveness, but other less perfect dispositions will operate, too (and will probably be the case for most practical purposes), although perhaps at lesser efficiencies. Of course, for the sake of simplicity of disclosure, a simple tow-cable arrangement is illustrated in the drawing. However, it should be understood, as previously suggested, that any desired cable arrangement may be used that maintains the exciter in substantially an optimum attitude and position, depending on the operational circumstances, since so doing would merely involve the making of design choices that would be obvious to the artisan having the benefit of the teachings herewith presented.

Preliminary calculations indicate that, when an exciter coil is submerged in water having a salinity equal to that of the sea (thereby, for example, having a conductivity factor of four reciprocal ohms per meter) and energized in such manner as to have a magnetic moment at one ampere-meter$^2$ at a frequency of one megacycle per second, an electric field strength of 0.078 volts per meter may be expected at a distance of one meter, measured from the center of the coil and perpendicular from the longitudinal axis thereof. Of course, in this respect, sea water is usually the limiting operational situation encountered, since river water usually becomes less saline as distance away from the mouth thereof increases and, therefore, the electromagnetic conductivity improves. On the other hand, magnetic dipole sources of the order of ten to a hundred times this magnitude could be expected from commercially available RF power sources. Selection of an optimum frequency would, of course, depend on balancing available field strength in water (which would fall with increasing frequency) plus losses in the water along the insulated conductor (which would also reduce the power available for subsequent radiation in the air) against the efficiency of the radiator (which would increase with frequency). The foregoing notwithstanding, and although a ten kilocycle per second to one megacycle per second frequency will function adequately, the preferred embodiment frequency seems to fall within the fifty to one hundred kilocycle per second range, and the power required therefor appears to fall within the one to ten kilowatt range.

Accordingly, if exciter coil 17 is towed at the proper distance from the river bottom and energized by suitable power, electromagnetic energy 18 is broadcast throughout the water and impacts upon the insulated command wires, if any, laying on said river bottom. Being insulated, said wires will be excited, act as coaxial cables, conduct electrical energy to the portion thereof not in the water, and re-radiate it therefrom in the form of electromagnetic energy 32, which carries the intelligence concerning the presence and location of command wires. This re-radiated or re-broadcast electromagnetic energy is then picked up by loop antenna 31 appropriately directed at the river bank and processed to more useful levels by sensitive tuned receiver 34. This energy pick-up, of course, indicates that a command wire has been passed over. Said pick-up is immediately indicated on readout 35, and being a real signal (that is, not a spurious background noise interface radiation), passes through thresholder 36 to set off alarm 37.

During the broadcast of the aforementioned electromagnetic energy throughout the river water, some effects adverse to the overall operation of the invention are generated. These effects not only include the inherent noises generated within the electronic components and circuitry, but also include deleterious spurious signals which emanate from the various interfaces (such as the water-river bottom and water-air interfaces), which ultimately permeate the atmosphere ambient to receiving antenna 31 as background noise, and, thus, tend to obliterate intelligence signal 32. Such interface radiations are especially undesirable because they radiate at the same frequency as those originally broadcast and also at the same frequency as those subsequently intended to be received and processed by said antenna 31 and the aforesaid RF receiver 34. Because of this, it is not possible to electronically filter the spurious ones out in the receiver. Therefore, it becomes necessary to exclude them through use of an antenna having a predetermined substantially unidirectional response pattern. Hence, if such an antenna is properly rotated to be directed to the bank of the river, the intensity of the intelligence signals re-radiated by that portion of the command wire exposed to the air will be greatest at the time the antenna response pattern is directed toward them. They will thereby provide a bearing signal representing the location said wires having a useful amplitude and a substantially maximum signal-to-noise ratio, inasmuch as the directivity characteristics of the antenna prevents the reception of practically all the aforesaid spurious noise signals.

Although the sounding of alarm 37 notifies the personnel operating the ship that a mine command wire has been crossed, it also provides important tactical information, in that it, in conjunction with the loop antenna positon, informs said personnel where a possible enemy is lurking, ready to attack.

Because ship 11 is ordinarily not of sufficient size and importance to be worth using a river mine to destroy, its function is well worthwhile if it prevents the destruction of larger, more important, perhaps cargo and military personnel carrying ships following it. Detection and warning may be sufficient to avoid the danger, but disabling the mine by cutting the command wires would be even better. Thus, the following of exciter 17 by any appropriate wire cutter 30 would be highly desirable, and, obviously, knowing that said wires have been cut is of paramount psychological importance as well as practical importance, too. To provide such advantages, the instant invention also performs the function of indicating that the command wires have been severed by indicating that a sudden change in amplitude of the re-broadcast signal occurs at that time.

Obviously, if the command wires are cut, the mine or mines they are connected to cannot be detonated and, for all practical purposes, are rendered harmless.

Ancilliary to the more obvious benefits provided by this invention, there is an additional benefit that is of sufficient importance to merit further explanation. As previously suggested, the risk of being attacked by an enemy from a concealed position on or near the river bank is considerable, as a cargo and/or troop carrying ship travels up the river. This, moreover, is especially true, once said ship has been disabled by an exploded river mine of the type concerned with by this invention. Therefore, not only is such risk reduced by the detection and cutting of mine command wires, it is also often further reduced by providing prior knowledge to said ship's complement that a possible attacking party of one or more people are located at a particular camouflaged position on the river bank. Experience in such situations has taught that such attacking parties usually lay in wait at or near the fire box used to detonate a river mine, and once said mine is exploded and the ship is in a more or less helpless condition, such attacks are probable. Hence, it may readily be seen that, during such circumstances, if and when command wires and the river bank location thereof are detected by the subject invention, a probable attack from that location can be anticipated, and the would-be attackers routed before it ever gets started.

Obviously many modifications and embodiments of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. Means for detecting an insulated electrical conductor which is partially submerged in water and which partially extends out of said water, comprising in combination:

means for broadcasting a predetermined quantity of electromagnetic energy within a body of water at such location that it impacts upon and passes around a wire to be detected that is partially submerged therein and partially extends out thereof, thereby generating an electrical current in said wire which is re-radiated thereby as electromagnetic energy at the out-of-the water position thereof; and means spatially disposed from said electromagnetic energy broadcasting means for receiving said re-radiated electromagnetic energy from substantially only the place where said wire extends out of said body of water.

2. A system for detecting an insulated electrical wire operatively incorporated therein, wherein said wire is partially submerged in a body of water and is partially disposed out of said body of water, comprising in combination:

a body of water capable of acting as a transport medium for a predetermined electromagnetic energy;

an insulated electrical conductor adapted for being connected at each end thereof to a utilization apparatus, said conductor having a portion thereof submerged in said body of water and a portion thereof extending out of said body of water;

means disposed for the broadcast of a predetermined electromagnetic energy within said body of water in such manner as to electromagnetically interact with that portion of said insulated electrical conductor that is likewise submerged therewithin, and thereby cause said insulated electrical conductor to re-broadcast a portion of said electro-magnetic energy into the atmosphere by that portion thereof extending out of said body of water; and receiving means, having a substantially unidirectional electromagnetic energy response pattern, capable of being oriented for response to the aforesaid electromagnetic energy re-broadcast from that portion of said insulated electrical conductor extending out of said body of water, thereby indicating the relative bearing thereof.

3. The device of claim 2 wherein said body of water is a river containing substantially fresh water.

4. The device of claim 2 wherein said body of water is the mouth of a river, where said river meets the sea, containing brackish water.

5. The device of claim 2 wherein said body of water is the ocean containing salt water.

6. The device of claim 2 wherein the utilization apparatus connected to each end of said insulated electrical conductor is an electrically detonated mine and a fire box, respectively.

7. The device of claim 2 wherein said means disposed for the broadcast of a predetermined electromagnetic energy therewithin includes an exciter coil.

8. The device of claim 2 wherein said means disposed for the broadcast of a predetermined electromagnetic energy therewithin includes a dipole antenna.

9. The device of claim 2 wherein said receiving means comprises:

a rotatable unidirectional receiving antenna;

a radio frequency receiver connected to the output of said receiving antenna; and a readout means coupled to the output of said radio frequency receiver.

10. The device of claim 2 wherein said means disposed for the broadcast of a predetermined electromagnetic energy within said body of water in such manner as to electromagnetically interact with that portion of said insulated electrical conductor that is likewise submerged therewithin comprises:

a radio frequency power source;

an exciter connected to the output of said radio frequency power source for broadcasting electromagnetic energy;

a hoist connected to said exciter for the timely raising and lowering thereof; and means connected to the aforesaid hoist for controlling same in such manner as to position said exciter at a predetermined altitude above the floor of said body of water.

11. The invention according to claim 2 further characterized by means spatially disposed from said electromagnetic energy broadcasting means for cutting the insulated electrical conductors indicated by the aforesaid receiving means.

12. The invention according to claim 9 further characterized by:

a thresholder connected to the output of said radio frequency receiver; and an alarm means connected to the output of the aforesaid thresholder.

13. The device of claim 10 wherein said means connected to the aforesaid hoist for controlling same in such manner as to position said exciter at a predetermined altitude above the floor of said body of water comprises:

an echo-ranger having a reversible electroacoustical transducer connected thereto; and a depth controller connected between the output of said echo-ranger and the control input of the aforesaid hoist.

14. The invention according to claim 13 further characterized by:

a readout means connected to the output of said echo-ranger for continuously indicating the altitude of said exciter above the floor of said body of water; and an adjustment means connected to said hoist for the manual control of the raising and lowering of said exciter by a human operator observing the aforesaid readout.

* * * * *